(No Model.)

C. W. BINGHAM, Jr.
FILTER.

No. 327,646. Patented Oct. 6, 1885.

WITNESSES
W. J. Cambridge
H. A. Decatur

INVENTOR
Charles W. Bingham Jr
By F. C. Teschemacher
Atty

UNITED STATES PATENT OFFICE.

CHARLES W. BINGHAM, JR., OF BOSTON, ASSIGNOR TO CHARLES H. KELLEY, OF REVERE, AND FRANCIS C. PERKINS, OF SOMERVILLE, MASS.

FILTER.

SPECIFICATION forming part of Letters Patent No. 327,646, dated October 6, 1885.

Application filed June 24, 1885. Serial No. 169,656. (No model.)

*To all whom it may concern:*

Be it known that I, CHARLES W. BINGHAM, Jr., of Boston, in the county of Suffolk and State of Massachusetts, have invented certain Improvements in Filters, of which the following is a full, clear, and exact description, reference being had to the accompanying drawings, making part of this specification, in which—

Figure 1:
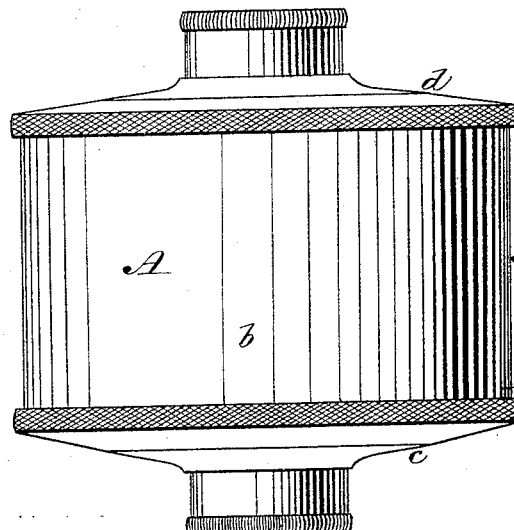
Figure 2:
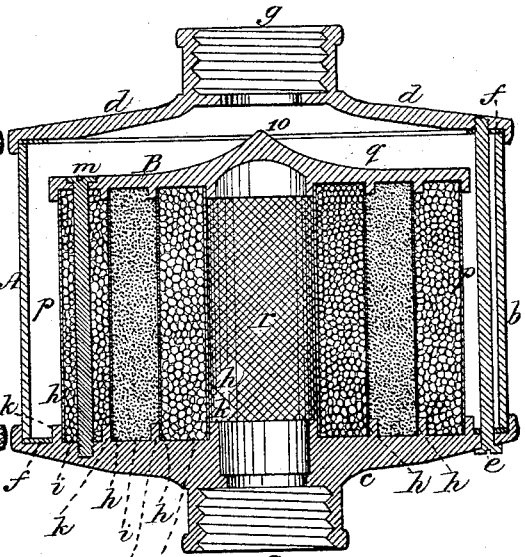
Figure 3:
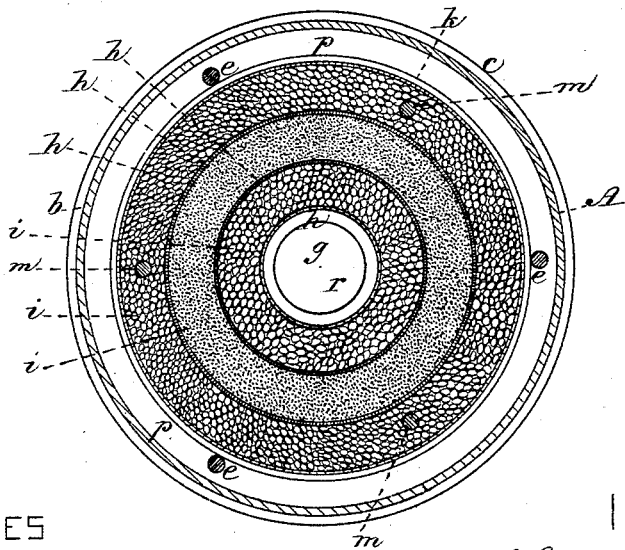

Figure 1 is a side elevation of a filter constructed in accordance with my invention. Fig. 2 is a vertical section through the center of the same. Fig. 3 is a horizontal section through the center of the same.

My invention has for its object to provide a simple, durable, and inexpensive filter having an extended area of filtering-surface, whereby less obstruction is offered to the free flow of the water; and my invention consists in the combination, with the outer cylindrical casing, of a series of cylindrical screens arranged concentrically within the same, and having the spaces between them filled with charcoal or other suitable filtering medium, said screens resting at one end upon one head of the casing and being held in place by a cap or disk, which covers and closes the opposite ends, and is secured in place by suitable bolts, a space being left between the said cap or disk and the adjacent head of the casing communicating with an aperture therein and leading to an annular chamber at the periphery, between the outer casing and the outer screen, while the central space inclosed by the inner screen is in communication with a central aperture in the opposite head of the casing, whereby the water is enabled to pass either from the inlet aperture directly to the chamber at the periphery, and thence inward through the screens and filtering material to the center and out through the discharge-outlet, or directly from the inlet to the center, and thence outward through the screens and filtering material to the chamber at the periphery, which then communicates with the discharge-outlet, as hereinafter more particularly set forth.

In the said drawings, A represents the outer casing of the filter, which consists of a main cylindrical portion, $b$, composed of metal, glass, or other suitable material, and two heads, $c\ d$, the whole being secured together by screw-bolts $e$, and leakage at the joints being prevented by packing-rings $f$. At the center of each of the heads $c\ d$ is an aperture, $g$, provided with a screw-thread to adapt either end of the filter to be screwed to the end of an ordinary faucet having a corresponding thread, whereby the filter can be reversed, when desired, to keep it free and clear of impurities.

Within the casing A are arranged concentrically a series of cylindrical screens, $h$, of different diameters, composed of woven wire or perforated metal of any desired degree of fineness, and having the annular spaces between them filled with animal-charcoal or other suitable filtering material, $i$. These screens $h$, which are of less height than the interior of the casing A, rest at one end on the inner face of the head $c$ of the casing, and are kept in their proper concentric positions by means of flanges $k$ thereon, and are held securely to the said head by means of a correspondingly-flanged imperforate cap or disk, B, which rests upon and covers their opposite ends, and is confined in place by bolts $m$, the lower ends of which are screwed into the head $c$.

Between the outer screen, $h$, and the cylindrical casing A is an annular chamber, $p$, communicating with the space $q$ between the cap or disk B and the adjacent head, $d$, and at the center of the filter is a chamber, $r$, inclosed by the inner screen, $h$, which is in communication with the aperture $g$ of the opposite head, $c$.

When the filter is in the position seen in Fig. 2, the water, as it enters by the upper aperture $g$ into the space $q$, strikes directly upon the top of the cap or disk B, which is provided with a central cone or projection, 10, and is thereby deflected and caused to pass uniformly around the filter to the annular chamber $p$ at the periphery of the same, and thence inward, through the screens $h$ and filtering material $i$, to the central chamber, $r$, from which it is discharged in a clean and purified condition through the lower aperture $g$ of the head $c$.

When the filter becomes obstructed by the collection of impurities, and it is desired to reverse the direction of the flow of the water to wash out or clear the same, the filter is unscrewed and again attached to the faucet in a reversed position, when the water will enter through the aperture $g$ of the head $c$ and pass directly to the central chamber, $r$, and thence outward through the screens $h$ and filtering material $i$ to the peripheral chamber $p$ and space $q$, and out through the aperture $g$ of the head $d$.

A series of any suitable number of concentrically-arranged screens $h$ may be employed, and in practice I prefer to fill the inside and outside spaces between these screens with coarse filtering material and the intermediate space or spaces with fine material, as seen in Figs. 2 and 3. The screens may also be of different degrees of fineness to correspond to that of the filtering material. By this arrangement the coarser filtering material and coarser screens will collect the coarser particles of dirt or foreign substances, whether the water is passing from the periphery to the center or from the center to the periphery, and will thus protect the finer material and finer screens, thus preventing the filter from becoming worn or injured by long usage.

As the screens and filtering material extend entirely around the interior of the cylindrical outer casing of the filter, a very large area of filtering-surface is presented, thus enabling the water to pass through the filter without any perceptible diminution of the flow, and at the same time be perfectly cleaned of all impurities or foreign substances, while the arrangement of the parts whereby the water is caused to flow either from the periphery to the center or from the center to the periphery affords a ready means of keeping the filter clean and free from obstruction.

What I claim as my invention, and desire to secure by Letters Patent, is—

The combination, with the casing A, composed of a cylindrical main portion, $b$, and two heads, $e$ and $d$, having inlet and discharge apertures $g$, of a series of vertically-arranged cylindrical-spaced screens, $h$, of different diameters, resting at one end upon the head $c$, the annular chamber $p$, between the outer screen and casing, the central chamber, $r$, communicating with the aperture $g$, an imperforate deflecting cap, B, placed over the other end of the screens and bolted to the head $c$, suitable flanges, K, formed on the inner faces of the cap and head, whereby the screens are separated and the spaces between them filled with a filtering medium, all combined and arranged to operate as herein described.

Witness my hand this 20th day of June, A. D. 1885.

CHARLES W. BINGHAM, Jr.

In presence of—
P. E. TESCHEMACHER,
W. J. CAMBRIDGE.